May 7, 1957 F. R. COHRS ET AL 2,791,317
DEVICE FOR INDEXING AND ROTATING ARTICLES
Filed Nov. 14, 1955 4 Sheets-Sheet 1

INVENTORS
FRED R. COHRS
WILLIAM R. SMITH
BY
ATTORNEY

INVENTORS
FRED R. COHRS
WILLIAM R. SMITH

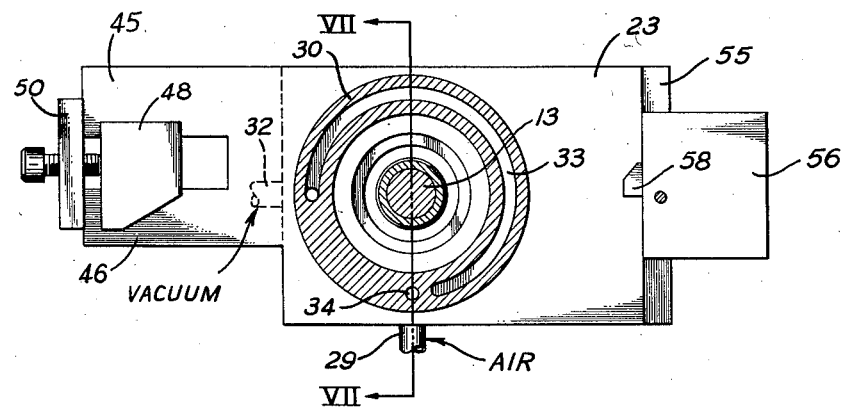
fig. 6
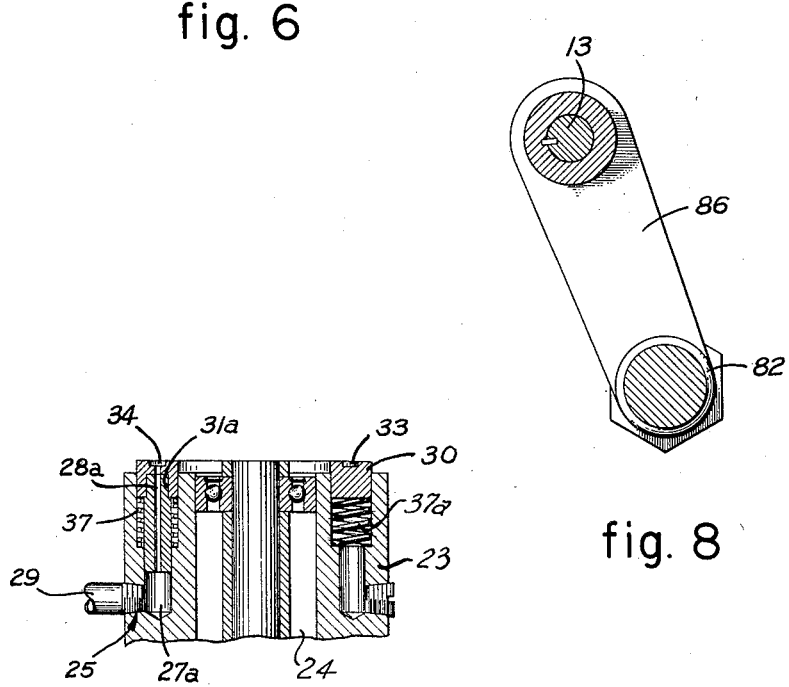
fig. 8
fig. 7

United States Patent Office 2,791,317
Patented May 7, 1957

2,791,317

DEVICE FOR INDEXING AND ROTATING ARTICLES

Fred R. Cohrs, Vicksburg, and William Ralph Smith, Kalamazoo, Mich., assignors to The Upjohn Company, Kalamazoo, Mich., a corporation of Michigan Application November 14, 1955, Serial No. 546,507

15 Claims. (Cl. 198—33)

This invention relates to an improved mechanism for indexing a turret-type article supporting apparatus and for intermittently rotating the article mounted thereon. More particularly, this invention relates to an improved and simplified mechanism for indexing a turret-type article carrying means and for rotating the articles between indexing operations in conjunction with the operation of a label applying machine wherein the labels are affixed to the articles between indexing operations.

In many industries, it is desirable and sometimes essential that an article being processed be rotated while undergoing treatment. Also where a large number of articles are to be processed, it has long been recognized that an article carrying turret, or rotating table, can be employed with advantage because of the greater ease and speed of operation which a turret-type machine affords over other types of apparatus. Prior constructions for effecting rotation of articles during treatment and for indexing an article carrying turret have been rather complicated and expensive and, in some cases, have not operated with complete satisfaction.

In applying labels to articles there is commonly employed a label feeding and applying device which picks up labels from a supply by suction, passes the labels over an adhesive applying roller and deposits the labels onto the article to be labeled. A pressure roller then contacts the label and affixes it to the article. With non-planar objects, such as bottles or vials, a more uniform and permanent bond between the label and the article is obtained where the article is rotated during the application of pressure to the label. To increase the speed and ease of operation of the label applying device it is preferable to use a turret supporting a series of article supporting means, such as mandrels, whereby the articles to be labeled many be placed on the article supporting means at one station, moved to the label applying station and then moved to an unloading station where the properly labeled article is removed.

Where, as is often the case, the label applying portion of the apparatus is to be adaptable to use with other types of article feeding devices, it is desirable that the article feeding device be capable of quick and easy mounting and de-mounting adjacent to, or on, the label applying machine for operation thereby or at least in timed relationship thereto.

Accordingly, it is an object of this invention to provide an improved mechanism for indexing an article supporting turret and for intermittently rotating the articles supported thereon.

It is a further object of this invention to provide an improved mechanism, as aforesaid, in which the articles supported on the turret are rotated between successive indexing operations of the turret.

It is a further object of this invention to provide an improved mechanism, as aforesaid, in which movement of a single mechanical element effects both the indexing of the turret and rotation of the articles.

It is a further object of this invention to provide an improved mechanism, as aforesaid, in which the single mechanical element above mentioned may be caused to respond to movement of associated apparatus, such as a labeling machine, by any convenient interconnecting mechanism, such as mechanism which includes fluid pressure means, electro-responsive means or wholly mechanical means.

It is a further object of this invention to provide an improved mechanism, as aforesaid, which is particularly adapted for use with substantially cylindrical articles and which is arranged to support the articles on mandrels secured to the periphery of the turret, said mandrels being rotated to effect rotation of the articles.

It is a further object of this invention to provide an improved mechanism, as aforesaid, which is readily adaptable for use with a standard labeling machine and, particularly, which may be mounted directly thereon and operated thereby.

It is a further object of this invention to provide an improved mechanism, as aforesaid, in which the mandrels are readily accessible to the operator or to automatic mechanical means for both application of the articles thereto and for removal of the articles therefrom.

A further object of the invention is to provide an improved mechanism, as aforesaid, in which the articles are in substantially full view of the operator in all operative positions of the mechanism, excepting only as the labeling machine itself may obstruct such view during the actual label applying process.

It is a further object of this invention to provide an attachment for a labeling machine utilizing a turret having a series of article carrying mandrels thereon and including an improved mechanism for indexing said turret and rotating said mandrels between successive indexing operations of the turret.

It is a further object of this invention to provide an attachment, as aforesaid, which is easy to construct, compact in size, simple in operation and effective in use.

Other objects and advantages of this invention will become apparent to those acquainted with equipment of this type upon reading the following description and inspecting the accompanying drawings.

In the drawings:

Figure 6 is a sectional view taken along the line VI—VI of Figure 3.

Figure 7 is a sectional view taken on line VII—VII of Figure 6 and rotated 90° clockwise.

Figure 8 is a sectional view taken on line VIII—VIII of Figure 4.

General description

Figure 1:
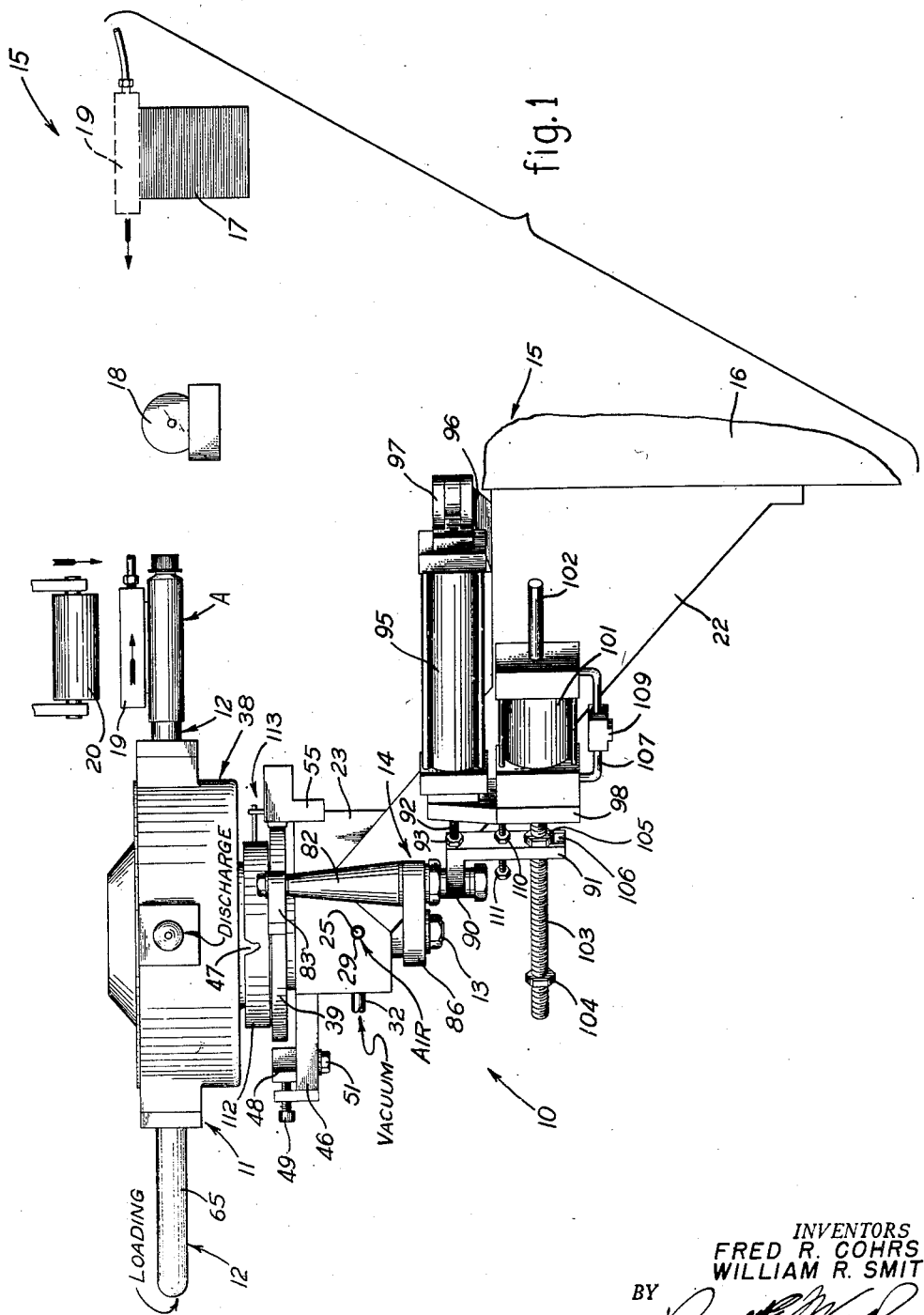
Figure 1 is a side elevation view of our article feeding device including a schematic showing of the essential parts of a labeling machine.

In general, the invention provides a turret-type, article feeding device or machine 10 (Figures 1 and 2) which includes a frame member 22 mountable upon a suitable support such as the frame 16 of a labeling machine 15. The frame member 22 includes an upstanding boss 23 at the upper, or free, end thereof. A rotatable table 11, which is comprised of a main body portion 38 and an indexing plate 39, is disposed above the boss 23 with the indexing plate immediately above the upper surface of the boss. A series of article supporting or holding means 12 are located at spaced intervals about the periphery of the table, extend radially therefrom, and are mounted for rotation relative thereto. A shaft 13 extends upwardly through the boss and through the table 11 and is drivingly connected to the article supporting means for imparting rotation thereto when the shaft 13 is rotated relative to the table. Linkage 14, which includes a post 82, is connected to the shaft 13 and to the indexing plate 39 and is arranged for (1) indexing said table through actuation of plate 39 and simultaneously rotating said shaft through an angular distance equal to that of the rotation of said table so that there is no relative rotation between the shaft and the table, and (2) then rotating said shaft independently of the table to cause rotation of the article holding means 12 with respect to said table.

*Detailed description*

Figure 2:
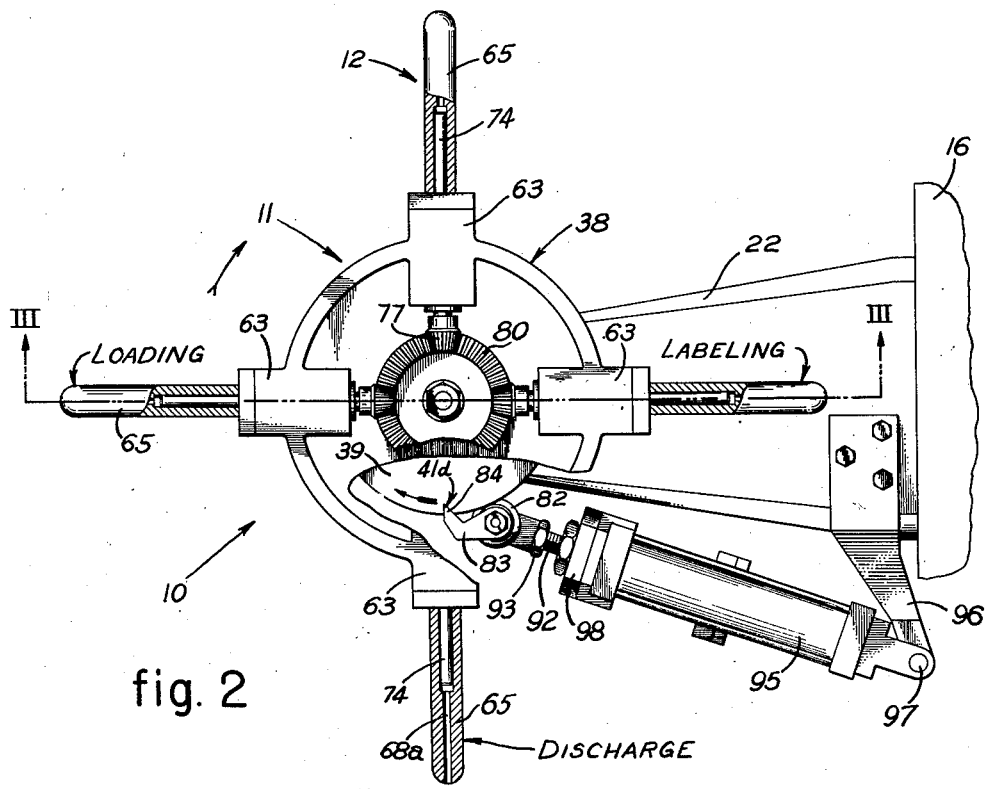
Figure 2 is a broken, top view of the device shown in Figure 1 with the top casing member of the turret removed.

Although the invention is applicable to turret-type article handling machines having various uses, it is particularly useful in connection with an article feeding device for a labeling machine and, accordingly, will be described primarily with reference thereto. As schematically shown in Figure 1, the labeling machine 15 includes a frame member 16, a supply of labels 17, and an adhesive applying roller 18. A suction feeding device 19 in the position shown in broken lines in Figure 1 picks up a label from the supply, moves the label across the adhesive applying roller 18 and then moves to the solid line position of device 19 as shown in Figure 1 where the label is deposited on the article A to be labeled. The pressure applying roller 20 then moves downwardly and applies pressure to the label to insure a firm bond between the article and the label.

Figure 3:
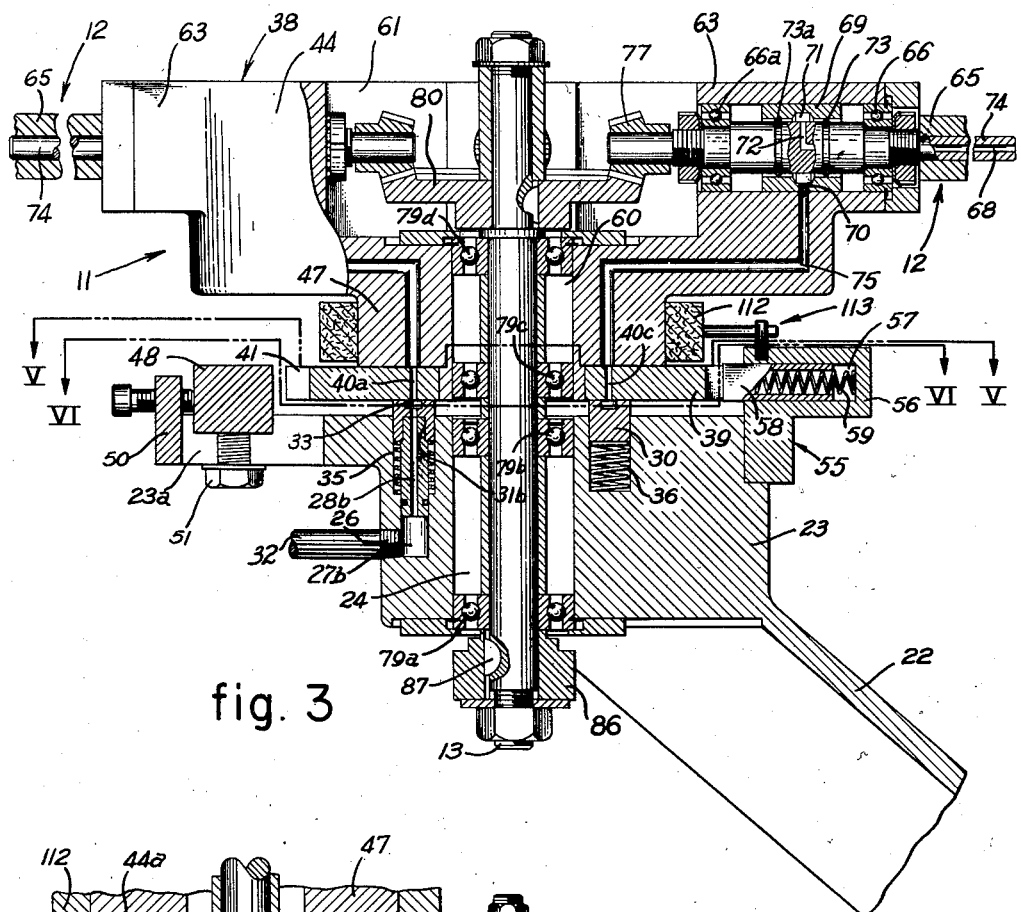
Figure 3 is a partially broken and partially sectional view of said device with the section taken along the line III—III of Figure 2.

The article feeding device includes a frame member 22 secured in any convenient, conventional fashion, as by bolts, to the frame 16 of labeling machine 15. The frame member 22 extends upwardly and outwardly from its point of attachment to the labeling machine. The outward end of the frame member 22 is formed with an upstanding boss 23. The boss 23 has a central opening 24 (Figures 3 and 7) through which the shaft 13 passes. A pair of openings 25 and 26 are provided in the boss. Opening 25 is connectible by line 29 to a source of fluid under pressure, e. g. compressed air, while the other opening 26 is connectible by line 32 (Figures 1 and 3) to a source of vacuum. Upwardly directed passages in the boss 23, shown at 27a in Figure 7 and at 27b in Figure 3, communicate with the openings 25 and 26, respectively. A pair of pipes, shown at 28a in Figure 7 and 28b in Figure 3, are disposed in the said passages in a fluid tight relationship thereto.

An intermediate ring 30 (Figures 3 and 7) is recessed into the upper surface of boss 23 and extends upwardly above said surface to contact the indexing plate 39. The ring 30, which is substantially stationary with respect to boss 23, includes in its lower surface a pair of cup-shaped recesses, shown at 31a in Figure 7 and 31b in Figure 3, for receiving the upper end of the pipes 28a and 28b, respectively, which communicate with the compressed air and vacuum sources, respectively. The upper surface of the ring 30 is formed with an arcuate groove 33 (Figures 3, 4, 6 and 7) which groove is in continuous communication with the vacuum source through pipe 28b, passage 27b and opening 26. The upper surface of the ring also has a port 34 (Figure 6) in continuous communication with the source of compressed air supplied through line 29. The ring 30 is urged into fluid-tight sealing relationship with the indexing plate 39 by a series of circumferentially spaced coil springs of which two appear at 35 and 36 in Figure 3 and of which two appear at 37 and 37a in Figure 7.

Figure 5:
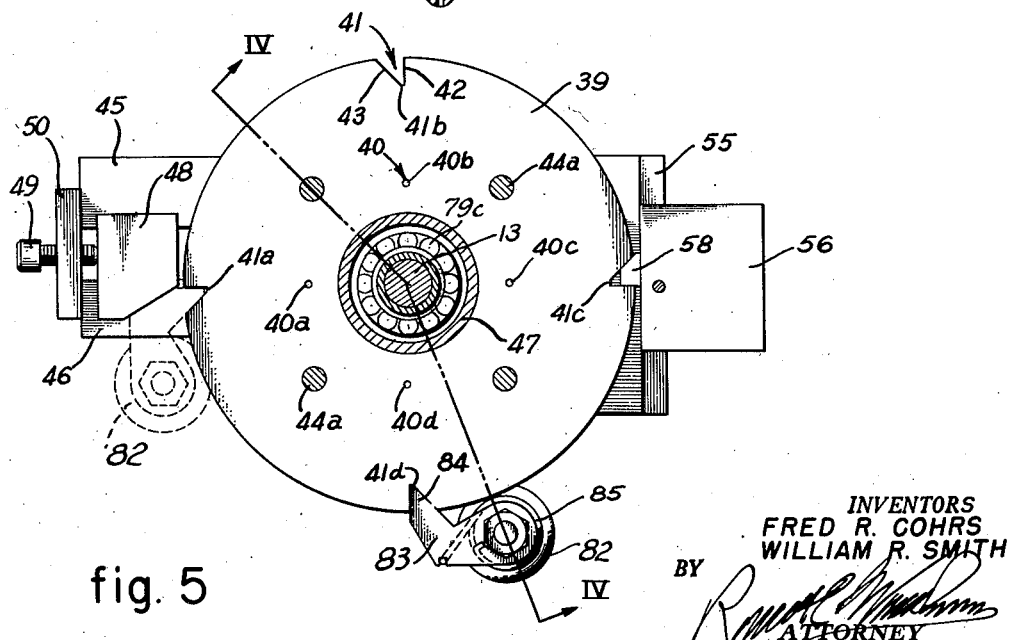
Figure 5 is a sectional view taken along the line V—V of Figure 3.
Figure 4:
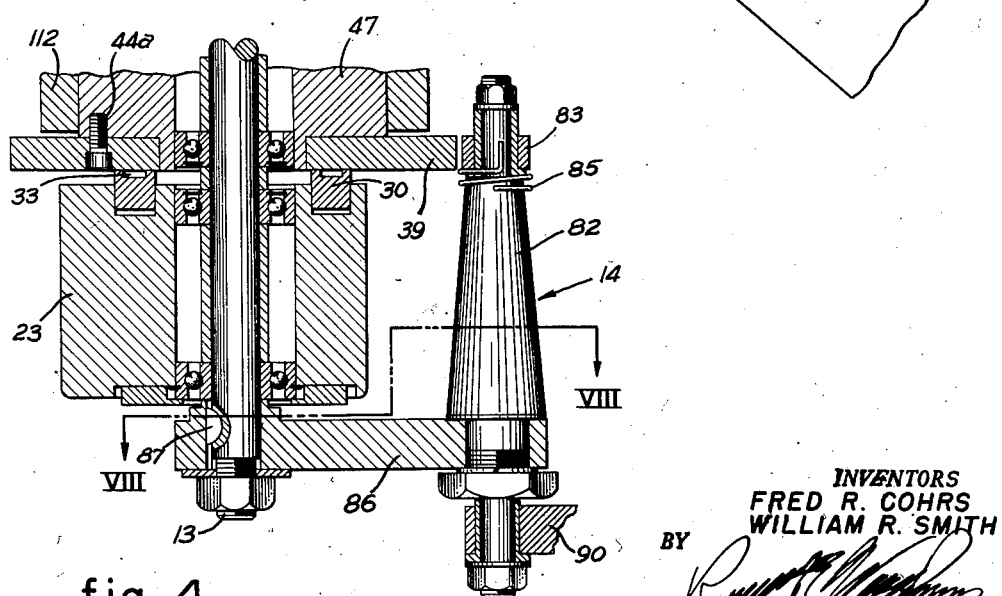
Figure 4 is a sectional view taken along the line IV—IV of Figure 5.

The table 11 includes a main body 38 and the indexing plate 39. The main body 38 is comprised of an upper portion 44 and a depending shank portion 47 (Figures 1 and 3). The indexing plate 39, which is in fluid sealing contact with the ring 30, is secured to the shank portion 47 in any convenient, conventional fashion such as by bolts 44a (Figures 4 and 5). The indexing plate 39 has a series of circumferentially spaced openings 40 (Figures 3 and 5), individually designated as 40a, 40b, 40c and 40d, therethrough equal in number to the number of article holding means 12 and circumferentially aligned therewith for purposes which will appear hereinafter. A series of spaced notches 41, individually designated as 41a, 41b, 41c and 41d, equal in number to the article supporting means, here four, are provided on the periphery of the indexing plate 39. As most clearly shown in Figure 5 the notches are defined by a radially directed leading edge 42 and by a trailing edge 43 which is at an acute angle, e. g. 45°, with respect to the leading edge.

The boss 23a (Figure 3) extends horizontally from a point near the upper end of the boss 23 and is provided with guides, or rails, 45 and 46 (Figure 5) on the upper surface thereof. An abutment block 48 (Figures 3 and 5) is slidably disposed between said guides and is adapted to be moved therealong by a bolt 49 acting through a plate 50 secured to the end of the guides. A locking nut 51 (Figure 1) is provided for locking the abutment block 48 in fixed position.

A flange member 55 (Figures 1, 3, 5 and 6) is mounted on the opposite side edge of the boss 23 from the abutment block 48. The flange member has a cup-shaped enlargement 56 (Figures 3 and 5) integral therewith. A detent plunger 58 is slidably mounted in a recess 57 provided in the enlargement 56. A spring 59 is mounted in the recess 57 contacting the detent plunger 58 and urging it into notches 41 as the indexing plate 39 is indexed. The detent plunger 58 is shaped to seat in said notches and, when so seated, permits movement of said table in one direction only, here rotation only in the clockwise direction as appearing in Figure 2.

As best shown in Figure 3, the main body 38 of the table 11 has a central opening 60 through which the shaft 13 passes. An enlarged recess 61 is formed in the upper portion 44 of the main body 38. The upper portion 44 is substantially circular and has a plurality of radially extending bosses 63 (Figures 2 and 3) formed at equally spaced intervals about the periphery of the main body.

As shown in Figure 3, the article holding means 12 is comprised of a mandrel 65 mounted on a mandrel shaft 74 which is supported by suitable bearings 66 and 66a in each of the bosses 63 for rotation relative to the table about an axis extending radially thereof.

The mandrel 65 and mandrel shaft 74 have coaxial, central openings 68a and 68, respectively (Figure 2), extending therethrough from the radially outer end of the mandrel to a point lying intermediate the ends of a sealing and bearing sleeve 69. An opening 70 is provided through the sleeve and communicates with a groove 71 formed on the radially inner surface of the sleeve which, in turn, communicates with opening 68 through opening 72 in shaft 74. A pair of sealing rings 73 and 73a are mounted between the mandrel shaft 74 and the sleeve 69 on either side of the groove 71 to provide a fluid-tight seal on either side of the groove. A passage 75 is provided in the main body 38 communicating at its upper end with the opening 70 and at its lower end with the opening 40c in the indexing plate 39. Openings 40a, 40b and 40d and passageways corresponding to passageway 75 are provided for each of the other mandrels 65.

The radially inner end of each mandrel shaft 74 (Figure 3) has a bevel pinion 77 mounted thereon. The shaft 13 extends upwardly through the central openings in the boss 23, the indexing plate 39 and the main body 38 and extends into the recess 61. Bearing structures 79a, 79b, 79c and 79d are provided for supporting the shaft 13 for rotation relative to the table 11 and the frame 22. A bevel gear 80 is secured to the shaft 13, as by a key and keyway, and lies in the recess 61. The bevel pinions 77 continuously mesh with the bevel gear 80 so that rotation of the shaft 13 and bevel gear 80 relative to the table causes rotation of the mandrels 65 relative to the table.

The linkage 14 (Figures 1 and 4) includes an upstanding post 82 whose axis lies substantially parallel with the longitudinal axis of shaft 13. The post 82 has a drive pawl 83 (Figures 1, 2 and 4) pivotally mounted thereon at the top thereof. The drive pawl has a tapered point 84 shaped to fit into the notches 41 in the indexing plate. A spring 85 (Figure 5) constantly urges the pawl 83 into contact with the side edge of the indexing plate 39.

A crank arm 86 (Figures 1, 4 and 8) is pivotally mounted on the post 82 adjacent the lower end thereof and is also fixed rigidly to the lower end of shaft 13 by the key 87. This connection causes the shaft 13 to rotate simultaneously with and to the same angular extent relative to the axis of shaft 13 as is traversed about said axis by the post 82.

As shown in Figure 1, an angle bracket 90 is secured to the post 82 and has a leg 91 extending downwardly. A piston rod 92 (Figures 1 and 2) is fixedly connected to bracket 90 by a lock nut 93. The piston rod 92 is mounted for movement in a cylinder 95 in response to application of fluid pressure therein. A mounting bracket 96 is secured to the frame member 22 and at its end provides a pivotal support 97 for cylinder 95.

A mounting bracket 98 (Figure 1) is secured to the cylinder 95, provided with clearance with respect to the piston rod 92, and supports at its lower end a cushioning cylinder 101. A piston rod 102 is mounted for movement in the cushioning cylinder 101 and has a threaded portion 103 on which stop nuts 104 and 105 are adjustably mounted. The threaded portion 103 of the piston rod 102 passes through a slot 106 formed in leg 91. The nuts 104 and 105 are adapted to abut against opposite sides of the leg 91, respectively, at selected points in the movement of the bracket 98 as discussed in greater detail hereinbelow. A conduit 107 connects the ends of the cylinder 101 in a closed circuit and allows the hydraulic fluid therewithin to move between said ends when the piston rod 102 moves in the cylinder 101. A needle valve 109 of any conventional form is provided in conduit 107 to regulate the flow of the fluid in the conduit.

A bolt 111 (Figure 1) is threaded into the leg 91 and bears against the bracket 98 in the retracted position of the crank, and may be locked in a selected position by the lock nut 110. Adjustment of the bolt 111 will control the length of the stroke of the rod 92 and will thereby control the amount of rotation imparted to the crank 86 and the shaft 13 as well as of the mandrels 65 when the shaft 13 is rotated relative to the table 11.

*Operation*

In readying the apparatus for use, the cylinder 95 (Figure 1) will be connected to suitable fluid supply lines, and the lines 32 and 29 will be connected to vacuum and pressure sources, respectively. The cylinder 101 and conduit 107 will be filled with suitable cushioning fluid and then arranged to provide a closed circuit for the fluid. The needle valve 109 will be adjusted to give the desired control over the cushioning effect of the cushioning fluid.

As disclosed, the table 11 employs four mandrels 65. As appearing in Figure 2, the nine o'clock position of each mandrel with respect to the axis of the table is the loading station where the articles to be labeled are placed on the mandrel. The table rotates clockwise and the mandrel at the three o'clock position is at the labeling station. The labeled articles are removed at the discharge station which is the six o'clock position of the mandrel. The twelve o'clock position of the mandrel is available, if desired, for other operations, such as application and/or tightening of a screw cap.

The groove 33 (Figure 6) in the resiliently supported, substantially stationary, intermediate ring 30 extends from the loading station to a point before, but in close proximity to, the discharge station. The groove is in constant communication with the opening 26 (Figure 3) and thereby vacuum is continuously maintained in the passage 68 and in each mandrel 65 from the point where the article is placed on the mandrel to a point closely adjacent the discharge station. The port 34 in the ring 30 is located at the discharge station and constantly communicates with the opening 27a (Figure 7). Thus, when a given mandrel reaches the discharge station with the consequent registry with the port 34 of the passageway 75 associated with said given mandrel, the compressed air entering through opening 25 immediately discharges the labeled article from said mandrel.

In carrying out a labeling operation, an article to be labeled is first placed on the one of the mandrels 65 which is positioned at the loading station. The table is then rotated in response to suitable manual or automatic controls (not shown), by introducing pressure fluid into the rightward side of the cylinder 95 to urge the piston rod 92 leftwardly as appearing in Figure 2. The post 82, together with drive pawl 83 and crank 86, is moved leftwardly by piston rod 92. Because of the pivotal mounting 97 of cylinder 95 and the engagement between drive pawl 83 and one of the notches 41, here the notch 41d, the post 82 will move in an arcuate path, similar to the path traced by the table, from the position thereof shown in solid lines in Figure 5 to the position thereof shown in broken lines in the same figure.

The drive pawl 83 (Figures 2 and 5) engages the adjacent one of the notches 41 in the indexing plate 39 and movement of pawl 83 with post 82 causes rotation of the plate 39 and the main body 38 of the table 11 through an arc sufficient to move all mandrels from one station to the next, here an arc of ninety degrees. The detent plunger 58 will enter into another of the notches 41, here the notch 41b, on the opposite side of the indexing plate 39 from the pawl 83 at the end of the indexing operation. Due to the shape of the notches and the plunger, the indexing plate can readily rotate in the desired direction but is effectively prevented from rotating in a reverse direction.

The forward or leftward movement of the post 82 (Figure 1) will carry the bracket 90 away from the nut 105. The bracket 90 will move forwardly with the piston 92 under the urging of the pressure fluid in cylinder 95 until it contacts nut 104. At that time the piston rod 102 is at its rightward, or back position as appearing in Figure 1. The bracket 90 will contact the nut 104 before the post 82 has moved to the end of its complete path. The pressure fluid in cylinder 95 will continue to urge the post forwardly which will cause the bracket 90 to move against nut 104 which causes the piston rod 102 to be moved leftwardly from the position shown in solid lines in the drawings. Such movement of the piston rod 102 is yieldingly opposed by the cushioning fluid in cylinder 101 and the speed of such movement will depend on the speed with which the fluid in cushioning cylinder 101 can move from one side of the piston face to the other through the conduit 107 and valve 109. The cylinder 101 and parts associated therewith permit a rapid, initial movement of the post 82 but cushions and slows down the final portion of the movement of the post.

During the forward or leftward movement of the post 82 (Figure 1), the shaft 13 will be rotated simultaneously and to the same angular extent as is the table 11, and, therefore, there will be no rotation of the mandrels 65 during this forward movement.

The forward movement of the post 82 and of the table 11 is stopped by engagement of the drive pawl 83 with the abutment block 48. At such time the detent plunger 58 (Figure 2) enters into the adjacent one of the notches 41 to hold the table against reverse movement.

Reverse movement of the piston 92 (Figure 1) is effected by introducing pressure fluid into the left end of cylinder 95. The post 82 will be moved in a reverse or rightward direction initially rapidly as the bracket 90 moves from nut 104 to nut 105 and then less rapidly when the cushioning cylinder 101 acts to retard further movement because of the cushioning effect of the fluid in cylinder 101 and conduit 107. During the reverse movement the drive pawl 83 will move out of the notch 41 with which it was previously associated and move relative to the table 11 which now remains stationary due to the action of the detent 58. At the extreme end of its movement the drive pawl 83 will move into the following notch 41 in the indexing plate 39 for actuation thereof in a subsequent cycle and the bolt 111 will contact the bracket 98.

During the reverse movement of post 82, movement of the crank 86 therewith causes rotation of shaft 13, which rotation is relative to the table 11. Such relative rotation effects rotation of the mandrels 65 due to the interengagement of bevel gear 80 and bevel pinions 77. The pressure applying roller 20 may apply pressure to a label on the article which is then in the labeling position as the article is rotated.

Thus, successive strokes of the rod 92 will cause regular stepwise, rotative, movement of the table to carry the several mandrels respectively from one station to the next, and the mandrels are all rotated on their own axes at the end of each such stepwise actuation of the table. An operator or an automatic feeder may place an article, as a vial, on each mandrel as it occupies the loading station. Other operations including checking may be performed as it occupies the next station. The article next occupies the labeling, or other processing, station and receives whatever treatment is intended for it, as the applying of a label. Finally, the article moves to the discharge station and is immediately removed from the mandrel on which it is located by air supplied from the line 29. Of course, if desired, the line 29 may be disconnected and the article removed by hand. This choice further adds to the flexibility in operation available in the machine of this invention.

While the rotatable table has been shown as having four mandrels mounted thereon, it is apparent that greater or lesser numbers of mandrels may be used to advantage, if desired, without hindering the satisfactory operation of the table indexing and mandrel rotating device.

A brake 112 (Figures 1 and 3) may, if desired, be arranged in constant dragging relationship to, and around, some convenient part of the table 11, as around the depending shank portion 47, and is held against rotation by connection to a non-rotating part at 113. This brake, if used, minimizes to a negligible amount the tendency of the table to run ahead of the rest of the machine when the mechanism including the cylinder 101 slows the rate of rotation of the shaft 13, which tendency becomes appreciable when the machine is operating at a high speed and may become troublesome.

Although a particular, preferred embodiment of our invention has been described above for illustrative purposes, it will be understood that variations or modifications thereof within the scope of such disclosure are fully contemplated unless specifically stated to the contrary in the appended claims.

We claim:

1. In a turret-type article handling machine, the combination including: a table mounted for indexing movement; article holding means positioned at spaced intervals about said table and mounted for rotation with respect thereto; a shaft mounted in said table for rotation relative thereto and drivingly connected to said article holding means; linkage engaging said table and said shaft; and means for causing said linkage first to rotate said shaft and index said table simultaneously and then to rotate said shaft relative to said table.

2. In a turret-type article handling machine, the combination including: a table mounted for indexing movement about an axis extending substantially perpendicular to the plane of the table; article holding means positioned at spaced intervals on the periphery of the table, said article holding means being mounted for rotation about their respective longitudinal axes with respect to said table; a shaft extending through said table and extending parallel with said axis, said shaft being mounted for rotation relative to said table and being drivingly connected to said article holding means such that rotation of said shaft relative to said table causes rotation of said article holding means relative to said table; means permitting said table to be indexed in only one direction; linkage connected to said table and to said shaft and movable such that movement of said linkage in one direction causes simultaneous and angularly equal rotation of said shaft and indexing of said table and movement of said linkage in reverse direction causes rotation of said shaft relative to said table.

3. The device defined in claim 2 wherein said linkage is movable in a direction parallel to the plane of the table and movement of the linkage in the direction in which said table is capable of indexing causes simultaneous and angularly equal rotation of said shaft and indexing of said table and movement of said linkage in reverse direction causes rotation of said shaft relative to said table.

4. The combination of claim 2 wherein said driving connection between said shaft and said article holding means includes a bevel gear mounted on said shaft for rotation therewith, each said article holding means having a pinion fixed thereon and meshing with said bevel gear.

5. The combination of claim 2 wherein a pressure fluid actuated piston is connected to and controls movement of said linkage.

6. The combination of claim 5 wherein said linkage includes a post connected to said piston and extending parallel with the axis of rotation of said table, said post being movable in a direction parallel with the plane of the table and in an arcuate path substantially parallel with the path traced by the table as it indexes; a crank fixedly connected to said shaft and pivotally connected to said post whereby movement of said post causes rotation of said shaft; a drive arm pivotally mounted on said post and urged into engagement with said table to drive same in its direction of indexing.

7. The combination of claim 6 wherein said piston is mounted in a cylinder and said cylinder is mounted for pivotal movement.

8. In a turret-type article handling device for use with a labeling machine, the combination including: a frame; a table mounted on said frame for indexing movement about an axis extending substantially perpendicular to the plane of the table; mandrels positioned at spaced intervals on the periphery of said table and extending radially therefrom, said mandrels being mounted for rotation about their longitudinal axes relative to said table; a shaft extending through said table co-axial with said axis of rotation for rotation relative to said table, said shaft being drivingly connected to said mandrels such that rotation of said shaft effects rotation of said mandrels relative to said table; means permitting said table to index in only one direction; a member pivotally mounted on said frame and movable through an arcuate path similar to the path traced by said table as it indexes; a crank fixedly connected to said shaft and pivotally connected to said member; a drive arm pivotally connected to said member and urged into contact with said table and adapted to index said table when said member moves in one direction through said arcuate path, movement of said member in said one direction causing indexing of said table and simultaneous rotation of said shaft, movement of said member in a reverse direction causing rotation of said shaft relative to said table.

9. The combination of claim 8 wherein a series of notches are formed in the periphery of said table, said means permitting said table to move in only one direction including spring urged detent means enterable into one of said recesses, said drive arm entering into another of said recesses to index said table.

10. The combination of claim 8 wherein said mandrels are each formed with a longitudinally extending passage, a passage in said table communicating with each passage in said mandrels, said frame member having compressed fluid and vacuum passageways formed therein, said passages in said table being movable into registry with the passageways in said frame.

11. The combination of claim 10 wherein said frame includes a boss having compressed fluid and vacuum passages therein, said boss having a central opening therein through which said shaft passes, an intermediate ring located between said boss and said table and resiliently urged into engagement with said table, said ring having passageways therein in communication with the passages in said bosses, said ring having a passageway of greater than 180° in extent in communication with said vacuum passage and a passageway in communication with said compressed fluid passage at the discharge station of said table.

12. In a turret-type article handling machine, the combination including: a table mounted for indexing movement; article holding means positioned at spaced intervals about said table and mounted for rotation with respect thereto; a shaft mounted in said table for rotation relative thereto and drivingly connected to said article holding means; driving means including a series of mechanically interconnected elements engaging said table and said shaft; and means for causing said driving means first to rotate said shaft and index said table at least partially simultaneously and then to rotate said shaft relative to said table.

13. In a turret-type article handling machine, the combination including: a table mounted for indexing movement about an axis extending substantially perpendicular to the plane of the table; mandrels positioned at spaced intervals on the periphery of said table and extending away therefrom, said mandrels being mounted for rotation about their longitudinal axes relative to said table; a shaft mounted in said table for rotation relative thereto and drivingly connected to said mandrels; means including a series of mechanically interconnected elements engaging said table and said shaft; and means for causing said last mentioned means first to rotate said shaft and index said table at least partially simultaneously and then to rotate said shaft relative to said table.

14. In a turret-type article handling machine, the combination including: a table mounted for indexing movement about an axis extending substantially perpendicular to the plane of the table; mandrels positioned at spaced intervals on the periphery of said table and extending radially therefrom, said mandrels being mounted for rotation about their longitudinal axes relative to said table; a shaft mounted in said table and extending parallel to the axis of rotation of said table, said shaft being rotatable with respect to said table and being drivingly connected to said mandrels; driving means including a series of mechanically interconnected elements engaging said table and said shaft; and means for causing said driving means first to rotate said shaft and index said table at least partially simultaneously and then to rotate said shaft relative to said table.

15. In a turret-type article handling machine, the combination including: a table mounted for indexing movement about an axis extending substantially perpendicular to the plane of the table, said table having a central opening therethrough along said axis; mandrels positioned at spaced intervals on the periphery of said table and extending radially therefrom, said mandrels being mounted for rotation relative to said table about their own longitudinal axes; a shaft extending through said central opening and co-axial with the axis of rotation of said table, said shaft being mounted for rotation relative to said table, means drivingly connecting said shaft to said mandrel such that rotation of said shaft effects rotation of said mandrels relative to said table; means including a series of mechanically interconnected elements engaging said table and said shaft; and means for causing said last mentioned means first to rotate said shaft and index said table at least partially simultaneously and then to rotate said shaft relative to said table.

References Cited in the file of this patent

UNITED STATES PATENTS 2,693,872      Baader               Nov. 9, 1954